United States Patent
Seo et al.

(10) Patent No.: US 10,305,297 B2
(45) Date of Patent: May 28, 2019

(54) BATTERY PACK AND CHARGE-CONTROLLING SYSTEM OF ELECTRIC VEHICLE INCLUDING THE SAME

(71) Applicant: SAMSUNG SDI CO., LTD., Yongin-si, Gyeonggi-do (KR)

(72) Inventors: Youngdong Seo, Yongin-si (KR); Gilchoun Yeom, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 93 days.

(21) Appl. No.: 15/191,459

(22) Filed: Jun. 23, 2016

(65) Prior Publication Data
US 2016/0380448 A1    Dec. 29, 2016

(30) Foreign Application Priority Data

Jun. 29, 2015   (KR) .................. 10-2015-0092033

(51) Int. Cl.
| | |
|---|---|
| *H02J 7/00* | (2006.01) |
| *B60L 3/04* | (2006.01) |
| *B60L 11/18* | (2006.01) |
| *H02H 7/18* | (2006.01) |

(52) U.S. Cl.
CPC ............. *H02J 7/0026* (2013.01); *B60L 3/04* (2013.01); *B60L 11/1877* (2013.01); *H02H 7/18* (2013.01); *H02J 7/007* (2013.01); *H02J 7/0031* (2013.01); *B60L 2240/549* (2013.01); *H02J 2007/0037* (2013.01); *H02J 2007/0039* (2013.01); *Y02T 10/705* (2013.01); *Y02T 10/7005* (2013.01)

(58) Field of Classification Search
CPC .......... Y02T 90/10; Y02T 90/12; Y02E 60/12; B60H 1/00385
USPC ..................... 320/109, 112; 701/22; 307/9.1
See application file for complete search history.

(56) References Cited

U.S. PATENT DOCUMENTS

| | | |
|---|---|---|
| 8,981,729 B2 | 3/2015 | Machida |
| 2012/0112703 A1* | 5/2012 | Xu .................. H02J 7/0022 320/145 |

(Continued)

FOREIGN PATENT DOCUMENTS

| | | |
|---|---|---|
| JP | 2012-244888 A | 12/2012 |
| KR | 10-2011-0002905 A | 1/2011 |
| KR | 10-2013-0073305 A | 7/2013 |

*Primary Examiner* — Zixuan Zhou
(74) *Attorney, Agent, or Firm* — Lewis Roca Rothgerber Christie LLP (57) ABSTRACT

A battery pack and a charge-controlling system of an electric vehicle including the same are provided. The battery pack includes a battery module including at least one rechargeable battery cell, a charge mode determiner configured to analyze characteristics of a charging current to the battery module, and configured to determine whether the battery pack is in a first charge mode or in a second charge mode, and a protector configured to set a protection current level of the battery module corresponding to the first charge mode or corresponding to the second charge mode, and configured to interrupt the charging current when a level of the charging current is higher than or equal to the protection current level corresponding to the respective one of the first charge mode or the second charge mode.

11 Claims, 5 Drawing Sheets

(56) References Cited

U.S. PATENT DOCUMENTS

| | | | |
|---|---|---|---|
| 2012/0286729 A1* | 11/2012 | Yegin | B60L 3/0069 |
| | | | 320/109 |
| 2012/0299552 A1* | 11/2012 | Machida | H02J 7/04 |
| | | | 320/138 |
| 2013/0119934 A1* | 5/2013 | Suzuki | H02J 7/0016 |
| | | | 320/112 |
| 2015/0263638 A1* | 9/2015 | Yang | H02M 7/04 |
| | | | 363/125 |

* cited by examiner

BATTERY PACK AND CHARGE-CONTROLLING SYSTEM OF ELECTRIC VEHICLE INCLUDING THE SAME

CROSS-REFERENCE TO RELATED APPLICATION

This application claims priority to, and the benefit of, Korean Patent Application No. 10-2015-0092033, filed on Jun. 29, 2015, in the Korean Intellectual Property Office, the disclosure of which is incorporated herein in its entirety by reference.

BACKGROUND

1. Field

One or more exemplary embodiments relate to a battery pack and a charge-controlling system of an electric vehicle including the same, and more particularly, to a battery pack and an overcharge protection system including the same that is configured to protect a battery from overcharging by forming a new discharge path if an abnormal state of the battery occurs due to overcharge.

2. Description of the Related Art

Much research has been conducted into rechargeable secondary batteries in association with the development of portable electronic devices, such as mobile phones, laptop computers, camcorders, or personal digital assistants (PDAs). Particularly, various kinds of secondary batteries, such as nickel-cadmium batteries, lead storage batteries, nickel-hydride batteries, lithium-ion batteries, lithium-polymer batteries, metal lithium batteries, or zinc-air batteries, have been developed. Such secondary batteries are generally manufactured in the form of cells, and then the cells are combined with charge/discharge circuits to form battery packs. Thereafter, the battery packs can be charged or discharged by connecting external terminals of the battery packs to external power sources or loads.

The battery packs may be installed in various devices requiring electrical energy, and generally include components to protect the battery packs from abnormal states, such as a state of overcharge or a state of over-discharge. Furthermore, voltages and currents of the battery cells may be monitored to protect the battery packs from the abnormal states. It may be useful to have a reference value that is used to distinguish an abnormal state from a normal state, and to determine whether the battery packs are in an abnormal state. However, it may be difficult to efficiently and securely use the battery packs in various environments if only one reference value is set.

SUMMARY

One or more exemplary embodiments include a battery pack capable of being efficiently used in various environments, and a charge-controlling system of an electric vehicle including the same, the charge-controlling system setting protection levels according to characteristics of a charging current provided to the battery pack.

Additional aspects will be set forth in part in the description which follows and, in part, will be apparent from the description, or may be learned by practice of the presented embodiments.

According to one or more exemplary embodiments, a battery pack includes a battery module including at least one rechargeable battery cell, a charge mode determiner configured to analyze characteristics of a charging current to the battery module, and configured to determine whether the battery pack is in a first charge mode or in a second charge mode, and a protector configured to set a protection current level of the battery module corresponding to the first charge mode or corresponding to the second charge mode, and configured to interrupt the charging current when a level of the charging current is higher than or equal to the protection current level corresponding to the respective one of the first charge mode or the second charge mode.

The protection current level corresponding to the second charge mode may be higher than the protection current level corresponding to the first charge mode.

The charge mode determiner may be configured to determine whether the battery pack is in the first charge mode or in the second charge mode by analyzing waveform characteristics of the charging current.

The charge mode determiner may be configured to determine that the battery pack is in the first charge mode when the charging current remains within a charging current range for a preset time.

The battery pack may further include a charging switch configured to control the charging current supplied to the battery module, and a discharging switch configured to control a discharging current output from the battery module, and the protector may be further configured to output a control signal for controlling the charging switch and the discharging switch.

According to one or more exemplary embodiments, a charge-controlling system of an electric vehicle includes a battery pack including a battery module including at least one rechargeable battery cell, a protector configured to set a protection current level of the battery module for a first charge mode and for a second charge mode, and configured to interrupt a charging current supplied to the battery module when a level of the charging current is higher than or equal to the protection current level, a driver configured to be driven by a discharging current output from the battery module, and a charge mode determiner configured to analyze characteristics of the charging current, and configured to determine whether the battery pack is in the first charge mode or the a second charge mode.

The first charge mode may be a charge mode of the charging current supplied from a charging device, and the second charge mode may be a charge mode of a regenerative current supplied from the driver.

The protector may be further configured to set the protection current level for the second charge mode to be higher than the protection current level of the first charge mode.

The charge mode determiner may be configured to determine whether the battery pack is in the first charge mode or the second charge mode by analyzing waveform characteristics of the charging current.

The charge mode determiner may be configured to determine the battery pack as being in the first charge mode when the charging current remains within a charging current range for a preset time.

The charge-controlling system may further include a charging switch configured to control the charging current supplied to the battery module, and a discharging switch configured to control a discharging current output from the battery module, and the protector may be further configured to output a control signal for controlling the charging switch and the discharging switch.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
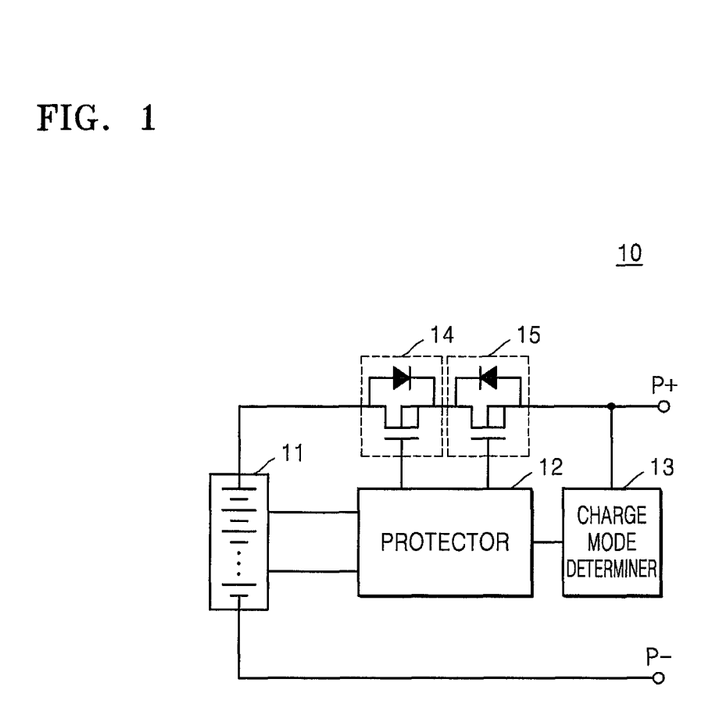
FIG. 1 is a schematic view of a battery pack according to an exemplary embodiment.

FIG. 1 is a schematic view of a battery pack, according to an exemplary embodiment.

Referring to FIG. 1, a battery pack 10 according to the present embodiment may include a battery module 11, a protector 12, and a charge mode determiner 13. The battery module 11 is a power storage unit, and includes at least one battery cell. The battery module 11 may include a plurality of battery cells connected to each other in series, in parallel, or in a series-parallel combination. The number of battery cells included in the battery module 11 may correspond to a suitable output voltage.

The battery module 11 may be connected to a load and to a charging device through terminals P+ and P−. The battery module 11 is configured to output electrical energy to the load through the terminals P+ and P− during discharging, and is configured to store electrical energy input from the charging device through the terminals P+ and P− during charging. When the battery pack 10 installed in a purely electric vehicle, which is driven only by electrical energy, or installed in a hybrid vehicle, which is driven by both electrical energy and fossil fuel, the load is a driving motor of the electric vehicle, and the charging device may be a charging device for an electric vehicle and a regenerative generator that is configured to regenerate energy during braking.

When the battery pack 10 forms an energy storage system with a power conversion system, wherein the power conversion system is connected between a generation system and a grid system, then the generation system may be the charging device, and the grid system may be the load.

The battery cell may include a chargeable secondary battery. For example, the battery cell may include a nickel-cadmium battery, a lead storage battery, a nickel-metal hydride battery (NiMH), a lithium-ion battery, or a lithium polymer battery.

The protector 12 is configured to set a protection current level of the battery module 11, and is configured to interrupt a charging current supplied to the battery module 11 when a level of the charging current supplied to the battery module 11 is not less than (i.e., higher than or equal to) the protection current level.

The protector 12 may set a protection current level to interrupt an over-current from flowing into the battery module 11. The protector 12 may monitor a level of a charging current supplied to the battery module 11, and when the level of the charging current supplied to the battery module 11 is equal to or higher than a certain level, the protector 12 may protect the battery module 11 by interrupting the charging current. Further, the protector 12 is configured to monitor a state of the battery module 11, and is configured to control general operation of the battery module 11, including charge and discharge operations. The protector 12 may be referred to as a Battery Management System (BMS).

The protector 12 may measure parameters, such as a cell voltage, a temperature, a charging current, and/or discharging current of the battery module 11, and the protector 12 may control the charge and discharge operations of the battery module 11 based on the measured data. The protector 12 may calculate residual electric energy, life span, or State of Charge (SOC) from the measured data, or may determine whether the battery module 11 is abnormal. For example, the protector 12 may determine whether overcharge, over-discharge, over-current, overvoltage, overheat, battery cell imbalance, and/or deterioration of a battery cell occurs. The protector 12 may perform a fixed operation according to an internal algorithm. For example, the protector 12 may control a charging switch and/or a discharging switch, or may blow a fuse. The protector 12 may control cell balancing operations of battery cells of the battery module 11 according to the measured data and a predetermined algorithm.

The charge mode determiner 13 is configured to determine whether the charging current is in a first charge mode or in a second charge mode by analyzing characteristics (e.g., waveform characteristics) of the charging current supplied to the battery module 11. The charging current supplied to the battery module 11 may be provided from various sources. When the battery pack 10 is installed in a purely electric vehicle that is driven only by electrical energy, or is installed in a hybrid electric vehicle that is driven by electrical energy and fossil fuel, the charging current may be provided from a charging device connected to the electric vehicle.

The charging current may have different characteristics according to types and/or characteristics of the sources providing the charging current to the battery pack 10. The representative characteristic may be a variation of a current level in a certain time.

The charge mode determiner 13 may determine the charge mode corresponding to the characteristics of the charging current, and may provide information about a current charge mode to the protector 12.

The protector 12 is configured to set the protection current level corresponding to the charge mode provided from the charge mode determiner 13. For example, in the first charge mode, the protection current level may be set to be higher than the protection current level in the second charge mode. Alternatively, in the second charge mode, the protection current level may be set to be higher than the protection current level in the first charge mode.

Levels or changes of a charging current provided from a charging device to a system or a driving motor may vary over time, and when a protection current level for limiting an over-current is set to a single fixed value, a charging operation may be interrupted due to the protector 12 performing a protection operation, even if the charging current is normal. This may cause a moving electric vehicle to suddenly stop, as the vehicle may misinterpret a normal charging current as an over-current, thereafter causing a protection device, such as a relay, to be turned off.

The charge mode determiner 13 is configured to determine a type of the source that is providing the charging current by analyzing characteristics of the charging current, and the protector 12 is configured to set a protection current level corresponding to a result of the determination by the charge mode determiner 13. Thus, it is possible to provide an environment in which the battery pack 10 may be operated in a normal state.

Further, the charge mode determiner 13 may determine a charge mode by analyzing a waveform of a charging current. For example, the charge mode determiner 13 may determine whether a charging current is in a first charge mode or in a second charge mode based on whether a level of the charging current changes within a changing current range between a first threshold and a second threshold during a preset time.

For example, when a charging current changes only within a range of 10 A to 30 A in three minutes, the charge mode determiner 13 may determine that the charge operation is being performed by a general charging device. On the contrary, when a charging current of less than 10 A or higher than 30 A for three minutes is applied to the battery pack 10, the charge mode determiner 13 may determine that the charge operation is performed by another source that is not a charging device.

When the battery pack 10 is installed in an electric vehicle, and when a charging current of higher than 30 A is applied to the battery pack 10 for three minutes, the charge mode determiner 13 may determine that the charging is regenerative charging performed by a motor. The regenerative charging performed by the motor may be the second charge mode, and the charge mode determiner 13 may inform the protector 12 that the battery pack 10 is being charged in the second charge mode. The protector 12 may set a protection current level corresponding to the second charge mode. In this case, the protection current level corresponding to the second charge mode may be higher than a protection current level corresponding to the first charge mode.

Generally, in the case of charging a battery pack by using a charging device, a current variation is small, and a level of a charging current is limited as a constant current-constant voltage (CC-CV) used for charging the battery pack. For example, when the charging device is of a 20 A type, the charging current is 20 A or less.

When a charging current that is applied to the battery module 11 is the same as or less than a current capacity of a charging device, and when a current variation is within a certain charging current range, the charge mode determiner 13 may determine that the charging device is connected to the battery pack 10.

Additionally, the battery pack 10 may further include a charging switch 14 and a discharging switch 15 to respectively interrupt a charging current supplied to the battery module 11, and a discharging current output from the battery module 11. When the charging switch 14 is turned off, the charging current supplied to the battery module 11 through the terminals P+ and P− from the outside is interrupted, and when the discharging switch 15 is turned off, the discharging current output from the battery module 11 to be supplied to the load is interrupted.

Switching operations of the charging switch 14 and of the discharging switch 15 may be controlled by the protector 12, and the protector 12 may output a control signal to control the switching operation of the charging switch 14 and the discharging switch 15. When a charging current having a level that is higher than the currently set protection current level is supplied to the battery module 11, the protector 12 turns off the charging switch 14, thereby preventing the occurrence of an abnormal state due to an over-current supplied to the battery pack 10.

Figure 2:
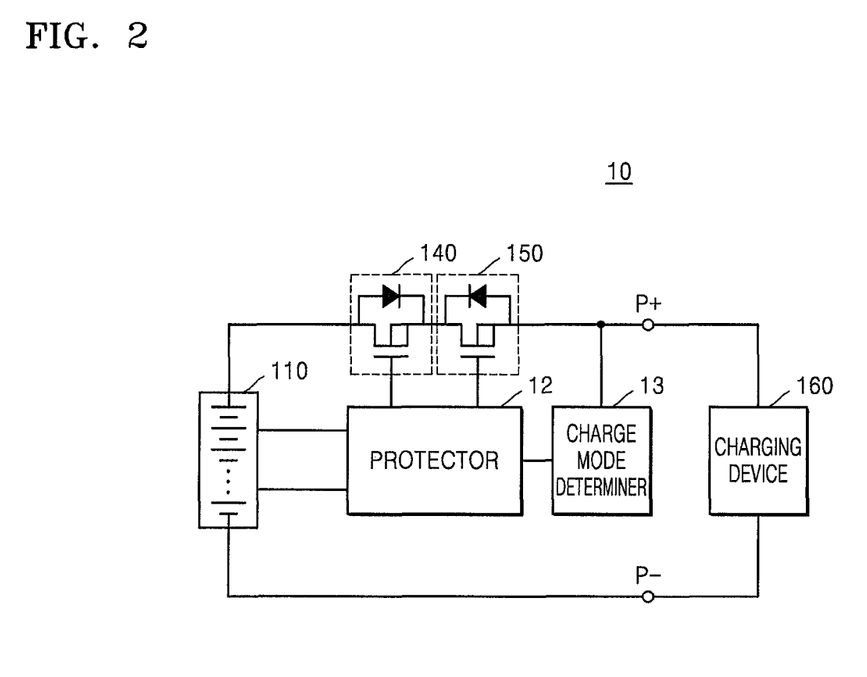
FIG. 2 is a schematic view of a connection between the battery pack of FIG. 1 and a charging device, according to an exemplary embodiment.

FIG. 2 is a schematic view of a connection between the battery pack of FIG. 1 and a charging device, according to an exemplary embodiment.

FIG. 2 illustrates a charging device 160 connected to the battery pack 10, and the battery pack 10 and the charging device 160 are connected to each other through terminals P+ and P−. The battery pack 10 includes a battery module 110, a protector 12, a charge mode determiner 13, and charging and discharging switches 140 and 150, and is configured to perform the operation described with reference to FIG. 1.

When a charging current is supplied to the battery pack 10 by the charging device 160, the charge mode determiner 13 analyzes characteristics of the charging current. As the charging current supplied to the battery pack 10 by the charging device 160 generally has a small variation, the charge mode determiner 13 may determine that the charging current is currently supplied by the charging device according to the characteristics of the charging current.

The charge mode determiner 13 provides the information described above to the protector 12, and the protector 12 is configured to protect the battery pack 10 according to a protection current level, which corresponds to a charge mode of the charging device. For example, if a charge mode of the charging device is a first charge mode, and if a protection current level in the first charge mode is 30 A, the protector 12 may turn off the charging switch 140 by outputting a control signal to the charging switch 140 when a charging current having a level that is higher than 30 A is applied to the battery pack 10.

Figure 3:
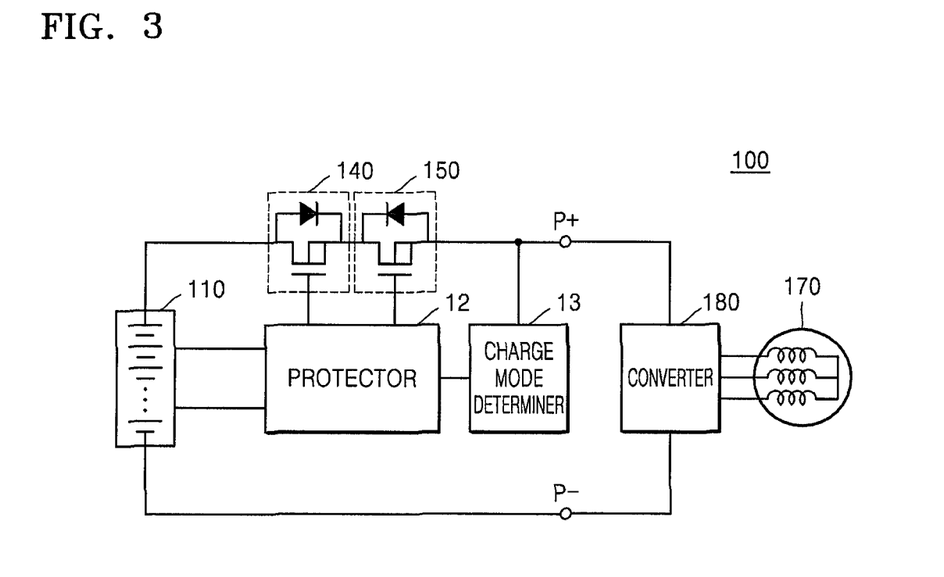
FIG. 3 is a schematic view of a charge-controlling system of an electric vehicle, according to an exemplary embodiment.

FIG. 3 is a schematic view of a charge-controlling system of an electric vehicle, according to an exemplary embodiment.

A charge-controlling system 100 of the electric vehicle includes a battery module 110 including at least one rechargeable battery cell, a protector 12, which is for setting a protection current level of the battery module 110 and for interrupting a charging current supplied to the battery module 110 when a level of the charging current supplied to the battery module 110 is not less than the protection current level, and a charge mode determiner 13, which is for analyzing characteristics of the charging current supplied to the battery module 110 and for determining whether the charging current is in a first charge mode or in a second charge mode.

Furthermore, the charge-controlling system 100 includes a driver 170 that is driven by a discharging current that is output from the battery module 110. FIG. 3 illustrates the driver 170 as a three-phase motor, and illustrates the charge-controlling system 100 as including a converter 180 that converts power generated in the driver 170, and being configured to provide the power to a battery pack 10.

The converter 180 may include transistors that are respectively connected to coils included in the driver 170, and a pair of transistors that are connected in series to each other may be connected in series to one coil of the driver 170. When three coils are included in the driver 170, as shown in FIG. 3, the converter 180 may include three pairs of transistors that may be connected in parallel to each other.

Although the present embodiment describes that the charge-controlling system 100 is used in an electric vehicle, other embodiments are not limited thereto. According to an exemplary embodiment, the charge-controlling system 100 may also be applied to other transportation means, such as an electric bicycle or a motorcycle, which may operate on power supplied from a secondary battery.

The driver 170 drives the electric vehicle by receiving electrical energy from the battery pack, and by converting the supplied electrical energy into kinetic energy. Furthermore, the driver 170 may generate regenerative energy by being connected to a wheel of the electric vehicle. For example, it is possible to drive downhill without using electrical energy supplied from the battery pack. In this case, regenerative energy may be generated in the driver 170 by using energy generated through a rotation of the wheel. The driver 170 may supply the regenerative energy to the battery pack, and the battery pack may store the regenerative energy supplied from the driver 170 in the battery module 110. Furthermore, the regenerative energy is supplied to the battery pack in the shape of a regenerative current.

Additionally, the driver 170 may charge the battery module 110 while the electric vehicle is braking. When a braking-force is applied to the electric vehicle, a torque direction of the driver 170 is changed such that the torque has a negative value, and thus the driver 170 may operate as a generator. Electrical energy generated in the manner described above may be supplied to the battery pack and may be stored in the battery module 110.

The charge mode determiner 13 is configured to analyze characteristics of a charging current supplied from the driver 170, and is configured to determine whether the battery pack 10 is being charged by the driver 170. The protector 12 may perform an operation of protecting the battery pack according to the determination of the charge mode determiner 13. For example, if a charge mode of a regenerative current output from the driver 170 is a second charge mode, and if a protection current level in the second charge mode is set to 50 A, the protector 12 may refrain from performing the operation of protecting the battery pack when a current of 50 A or less is applied, and may perform the operation of protecting the battery pack by interrupting the charging current when the applied current is higher than 50 A.

Meanwhile, the battery module 110, the protector 12, and the charge mode determiner 13 may be included in the battery pack. The battery pack may further include a charging switch 140 and a discharging switch 150.

As described above, when a current exceeding the protection current level in the second charge mode is applied to the battery pack, the protector 12 outputs a control signal to turn off the charging switch 140. A path of a charging current supplied from the outside of the battery pack is cut off when the charging switch 140 is turned off, and the battery module 110 is not charged any more, and as a result, the battery pack may be protected from an over-current otherwise causing an abnormal state.

Figure 4:
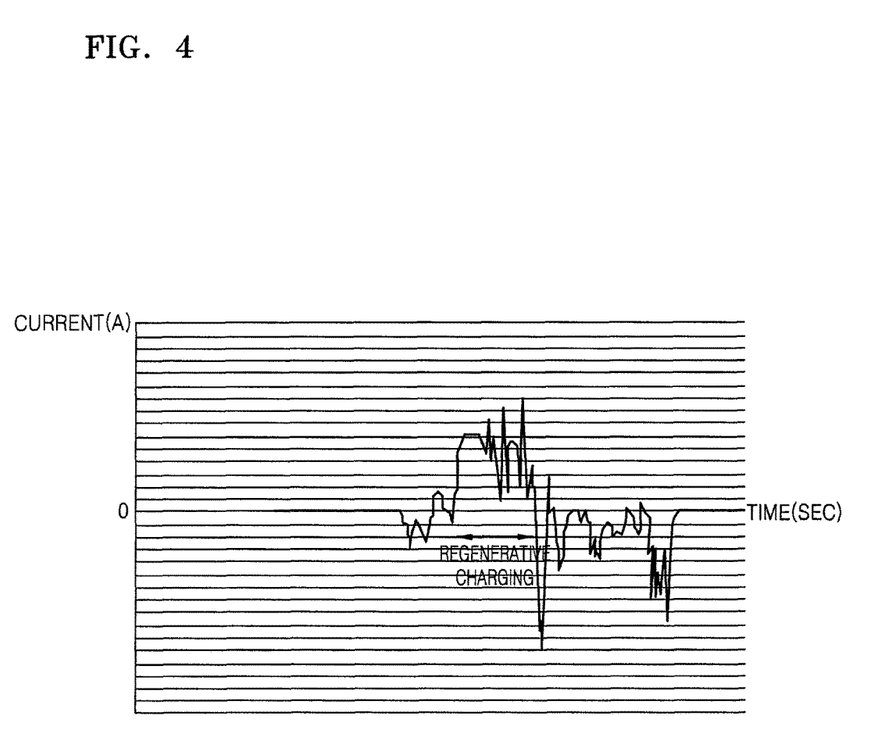
FIG. 4 is a graph of a waveform of a charging current during regenerative charging of a battery pack, according to an exemplary embodiment.

FIG. 4 is a graph of a waveform of a charging current during regenerative charging of a battery pack.

The graph of FIG. 4 illustrates a variation of a regenerative current (charging current) level over time. A current of a negative value in the graph represents a discharging current output from the battery pack, and such a situation may be understood as an electric vehicle being driven by energy output from the battery pack in a section including the discharging current.

On the contrary, a current of a positive value in the graph may be the regenerative current generated in the driver 170 described above with reference to FIG. 3. Furthermore, it may be understood that a section including the regenerative current is a section when an electric vehicle generates electrical energy by moving downhill or by braking, and stores the generated electrical energy in the battery pack.

Meanwhile, as illustrated in graph of FIG. 4, the regenerative current generated during regenerative charging may be generated in irregular shape over time, and patterns of charging and discharging of a battery according to the regenerative charging are not consistent. Therefore, a protection current level during the regenerative charging should be different from that during charging by a general charging device.

As illustrated in FIG. 4, a charging current having an irregular peak may be applied to the battery pack during the regenerative charging, and a charging switch may be turned off when the charging current is determined to be an over-current. In this case, an electric vehicle including the battery pack may stop suddenly during driving, which may cause a serious accident.

Figure 5:
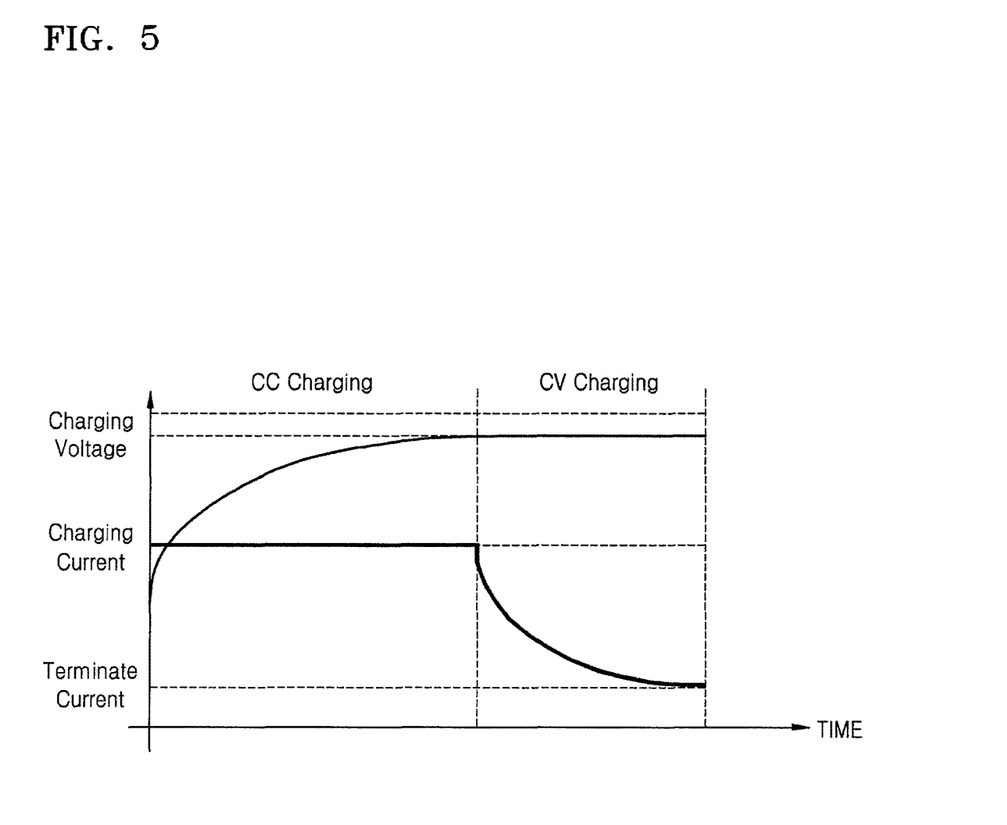
FIG. 5 is a graph of a charging current and charging voltage during charging of a battery pack by using a charging device, according to an exemplary embodiment.

FIG. 5 is a graph of a charging current and charging voltage during charging of the battery pack via a charging device, according to an exemplary embodiment.

Solid lines represent a level of the charging voltage and a level of the charging current in the graph of FIG. 5. Furthermore, an x-axis of the graph corresponds to time. Referring to FIG. 5, a current of a certain level is applied to the battery pack, and voltage of the battery pack gradually increases in a constant current (CC) charging section. Then a voltage of a certain level is applied to the battery pack in a constant voltage (CV) section after the CC charging section, and thus, a level of the charging current is reduced to a "terminate current."

Referring to FIG. 5, as the charging device performs the CC-CV charging, a current variation is small, and the level of the charging current is limited. For example, if the charging device is of a 20 A type, the charging current is 20 A or less.

Meanwhile, according to the battery pack 10 or according to the charge-controlling system 100 of the electric vehicle according to the described embodiments, the charge mode determiner 13 may determine that charging is performed by a general charging device when the charging current illustrated in the graph of FIG. 5 is applied to the battery pack 10, and the protector 12 may perform a protection operation according to a protection current level corresponding to the determination by the charge mode determiner 13.

For example, when the charging device performs charging, the charge mode determiner 13 may determine the occurrence of a first charge mode, and the protector 12 may perform a protection operation corresponding to a protection current level that corresponds to the first charge mode. The protection current level in the first charge mode may be changed according to a rated charging current of the charging device, for example, a protection current level of a charging device of a 20 A type may be set to about 30 A.

Meanwhile, as described above with reference to FIG. 4, when the regenerative charging is performed by a driver of the electric vehicle, the charge mode determiner 13 may determine the occurrence of a second charge mode, and the protector 12 may perform a protection operation corresponding to the protection current level that corresponds to the second charge mode.

As described above, when an irregular charging current is applied to the battery pack during the regenerative charging, the protection current level in the second charge mode may be set to be higher than the protection current level in the first charge mode. For example, a protection current level in the second charge mode may be set to be about 40 A. In this case, even when a charging current exceeding the protection current level of the first charge mode, but not exceeding the protection current level of the second charge mode of 40 A, is applied to the battery pack, a charging current interrupting operation is not performed by the protector 12.

As described above with reference to FIGS. 1 to 5, according to the battery pack 10 and the charge-controlling system 100 of the electric vehicle including the same, the battery pack may be securely efficiently used in various environments by setting protection current levels according to characteristics of charging currents provided to the battery pack.

It should be understood that the exemplary embodiments described herein should be considered in a descriptive sense only, and not for purposes of limitation. Descriptions of the features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. A battery pack comprising:
   a battery module comprising at least one rechargeable battery cell;
   a charge mode determiner configured to analyze characteristics of a charging current to the battery module, configured to determine whether the battery pack is in a first charge mode or in a second charge mode based on the analyzed characteristics of the charging current to the battery module, and configured to determine a type of a source providing the charging current based on the analyzed characteristics of the charging current; and
   a protector configured to set a protection current level of the battery module corresponding to the first charge mode or corresponding to the second charge mode, and configured to interrupt the charging current when a level of the charging current is higher than or equal to the protection current level corresponding to a determined one of the first charge mode or the second charge mode.

2. The battery pack of claim 1, wherein the protection current level corresponding to the second charge mode is higher than the protection current level corresponding to the first charge mode.

3. The battery pack of claim 1, wherein the charge mode determiner is configured to determine whether the battery pack is in the first charge mode or in the second charge mode by analyzing waveform characteristics of the charging current.

4. The battery pack of claim 1, wherein the charge mode determiner is configured to determine that the battery pack is in the first charge mode when the charging current remains within a charging current range for a preset time.

5. The battery pack of claim 1, further comprising:
   a charging switch configured to control the charging current supplied to the battery module; and
   a discharging switch configured to control a discharging current output from the battery module,
   wherein the protector is further configured to output a control signal for controlling the charging switch and the discharging switch.

6. A charge-controlling system of an electric vehicle, the charge-controlling system comprising:
   a battery pack comprising a battery module comprising at least one rechargeable battery cell;
   a protector configured to set a protection current level of the battery module for a first charge mode and for a second charge mode, and configured to interrupt a charging current supplied to the battery module when a level of the charging current is higher than or equal to the protection current level;
   a driver configured to be driven by a discharging current output from the battery module; and
   a charge mode determiner configured to analyze characteristics of the charging current, configured to determine whether the battery pack is in the first charge mode or the second charge mode based on the analyzed characteristics of the charging current, and configured to determine a type of a source providing the charging current based on the analyzed characteristics of the charging current.

7. The charge-controlling system of claim 6, wherein the first charge mode is a charge mode of the charging current supplied from a charging device, and
   wherein the second charge mode is a charge mode of a regenerative current supplied from the driver.

8. The charge-controlling system of claim 6, wherein the protector is further configured to set the protection current level for the second charge mode to be higher than the protection current level of the first charge mode.

9. The charge-controlling system of claim 6, wherein the charge mode determiner is configured to determine whether the battery pack is in the first charge mode or in the second charge mode by analyzing waveform characteristics of the charging current.

10. The charge-controlling system of claim 6, wherein the charge mode determiner is configured to determine the battery pack as being in the first charge mode when the charging current remains within a charging current range for a preset time.

11. The charge-controlling system of claim 6, further comprising:
    a charging switch configured to control the charging current supplied to the battery module; and
    a discharging switch configured to control a discharging current output from the battery module,
    wherein the protector is further configured to output a control signal for controlling the charging switch and the discharging switch.

* * * * *